(12) United States Patent
Sprinkle

(10) Patent No.: US 7,344,299 B2
(45) Date of Patent: Mar. 18, 2008

(54) MIXING SYSTEM AND PROCESS

(75) Inventor: Jerrill Sprinkle, Suwanee, GA (US)

(73) Assignee: MP Equipment Company, Buford, GA (US)

( * ) Notice: Subject to any disclaimer, the term of this patent is extended or adjusted under 35 U.S.C. 154(b) by 0 days.

(21) Appl. No.: 10/969,763

(22) Filed: Oct. 20, 2004

(65) Prior Publication Data

US 2005/0169099 A1    Aug. 4, 2005

Related U.S. Application Data

(60) Provisional application No. 60/512,899, filed on Oct. 21, 2003.

(51) Int. Cl.
*B01F 15/02* (2006.01)

(52) U.S. Cl. ............... 366/136; 366/152.3; 366/152.5; 366/182.2; 366/182.4

(58) Field of Classification Search ............... 366/149, 366/136, 137, 152.5, 182.4, 182.2, 152.3
See application file for complete search history.

(56) References Cited

U.S. PATENT DOCUMENTS

| | | | | |
|---|---|---|---|---|
| 3,352,543 | A | * | 11/1967 | Niederman et al. .......... 366/286 |
| 3,893,811 | A | * | 7/1975 | Good et al. ................. 422/109 |
| 3,910,564 | A | * | 10/1975 | Graham et al. ................ 366/18 |
| 4,014,743 | A | * | 3/1977 | Black ........................... 435/99 |
| 4,058,083 | A | | 11/1977 | Miller |
| 4,154,094 | A | * | 5/1979 | Norcross .................... 73/54.15 |
| 4,198,167 | A | | 4/1980 | Deal et al. |
| 4,380,193 | A | * | 4/1983 | Tadema ........................ 99/452 |
| 4,393,854 | A | * | 7/1983 | Tacquet ....................... 123/576 |
| 4,403,866 | A | * | 9/1983 | Falcoff et al. ............... 366/132 |
| 4,505,593 | A | | 3/1985 | Miller et al. |
| 4,612,800 | A | * | 9/1986 | Erian ......................... 73/54.01 |
| 4,687,674 | A | | 8/1987 | Akesson |
| 4,721,874 | A | * | 1/1988 | Emmert ...................... 73/54.41 |
| 4,812,045 | A | * | 3/1989 | Rivers ......................... 366/107 |
| 4,920,787 | A | * | 5/1990 | Dual et al. .................. 73/54.41 |

(Continued)

OTHER PUBLICATIONS

Brookfield Engineering Inc., 2003 Viscometers Rheometers for Laboratory and Process Applications, published Nov. 2002, pertinent pages: Cover sheet, introduction, and pp. 54-55, and end page.*

(Continued)

*Primary Examiner*—Tony G. Soohoo
(74) *Attorney, Agent, or Firm*—Hahn Loeser ±Parks LLP; Scott M. Oldham

(57) ABSTRACT

A batter mixing apparatus and process is disclosed for mixing a dry batter mix with a predetermined amount of water is adapted to continuously measure the temperature and the viscosity, in centipoises, with an inline viscometer. The controls of the apparatus are fully automated using a programmable logic controller in conjunction with a touch-screen display that provides real-time data, process control parameters, and a choice of batter recipes. Once the batter has reached a desired viscosity, a variable speed feed pump is used to pump the batter to a batter applicator where a food product is coated. Excess batter from the applicator is collected and returned to the mixing apparatus via a pump. The viscosity and temperature of the returned batter is measured and adjusted automatically with dry batter mix or water in order to satisfy the set parameters.

16 Claims, 10 Drawing Sheets

U.S. PATENT DOCUMENTS

| | | | |
|---|---|---|---|
| 5,114,239 A * | 5/1992 | Allen | 366/6 |
| 5,233,916 A * | 8/1993 | Butler et al. | 99/325 |
| 5,365,778 A * | 11/1994 | Sheen et al. | 73/54.41 |
| 5,426,137 A * | 6/1995 | Allen | 523/318 |
| 5,476,320 A * | 12/1995 | Taguchi et al. | 366/152.1 |
| 5,582,484 A * | 12/1996 | Asa | 366/149 |
| 5,590,960 A * | 1/1997 | Clinton et al. | 366/134 |
| 5,599,100 A * | 2/1997 | Jackson et al. | 366/152.5 |
| 5,602,085 A * | 2/1997 | Peterson et al. | 508/579 |
| 5,626,919 A * | 5/1997 | Chapman et al. | 425/174.4 |
| 5,750,186 A * | 5/1998 | Frazzitta | 427/8 |
| 5,921,679 A * | 7/1999 | Muzzio et al. | 366/348 |
| 5,937,744 A | 8/1999 | Nothum, Sr. et al. | |
| 6,158,332 A | 12/2000 | Nothum, Sr. et al. | |
| 6,180,310 B1 * | 1/2001 | Pinsly | 430/131 |
| 6,439,034 B1 * | 8/2002 | Farone et al. | 73/54.24 |
| 6,491,421 B2 * | 12/2002 | Rondeau et al. | 366/8 |
| 6,510,810 B2 * | 1/2003 | Nothum et al. | 118/26 |
| 6,656,280 B2 * | 12/2003 | Oota et al. | 118/688 |
| 6,849,190 B2 * | 2/2005 | Abu-Orf | 210/709 |
| 6,912,891 B2 * | 7/2005 | Coupland et al. | 73/64.53 |
| 2002/0020343 A1 | 2/2002 | Nothum, Sr. et al. | |
| 2002/0122839 A1 * | 9/2002 | Chapman et al. | 425/174.4 |
| 2003/0051535 A1 * | 3/2003 | Coupland et al. | 73/64.53 |
| 2004/0099050 A1 * | 5/2004 | Matsiev et al. | 73/61.45 |
| 2004/0233775 A1 * | 11/2004 | van der Eerden et al. | 366/98 |
| 2005/0013890 A1 * | 1/2005 | Chapman et al. | 425/174.4 |

OTHER PUBLICATIONS

Brookfield Engineering Inc., Brookfield Process Viscometers—Why Measure Iscosity In-Line?, date unknown, pp. 67-78.*

Institute of Mechanical Systems, Recent Developments, http:/www.zfm.ethz.ch/e/viscometry/recent-developments.htp, 4 pgs, and link to Dynamic Viscometry [PDF] pp. 1-4, total 8 pages.*

ABC-III Automatic Batter Control, Various photographs and descriptions, no date, 2 pgs.

Sam Stein Associates Inc., Marketing Literature associated with Stein Batter Chilling Unit & Stein Viscosity Control Unit, Sandusky, Ohio.

* cited by examiner

MIXING SYSTEM AND PROCESS

RELATE BACK

This application claims the benefit of U.S. Provisional Application No. 60/512,899 filed with the U.S. Patent Office Oct. 21, 2003.

TECHNICAL FIELD

This invention relates to a system and process for mixing materials into a substantially homogenous product, such as a batter material. More particularly, the invention relates to a system and method for mixing materials to form a product having a desired viscosity profile, and may include the continuous measurement of the actual viscosity of the product.

BACKGROUND OF THE INVENTION

In the food processing industry as an example, various devices and processes have been developed for preparing coated food products. For example, in large-scale food processing environments, the food products may be battered and breaded using in-line processing equipment. The food products are introduced to a batter applicator machine and dipped or otherwise coated with a batter having a desired formulation and consistency. Thereafter, the food products may be breaded, fried or otherwise processed as desired. The batter applicator is supplied with an amount of batter material from a mixing machine to as to allow for continuous processing of food products passing therethrough. Although batter mixing apparatus have been developed for this purpose, the existing apparatus do not allow effective control over batter viscosity and temperatures to provide a consistent and repeatable batter material. It would therefore be desirable to provide a system and methods for producing batter having predetermined characteristics and attributes, to allow proper coating and preparation of food products in an in-line processing system.

Batter mixing equipment previously developed also operated in an isolated fashion, with an operator controlling the functions of the mixing machine and therefore the quality of batter produced thereby. It would therefore be desirable to provide a system and methods to allow operation of a batter mixing machine in a manner such that the machine is integrated into an overall processing system, and to allow centralized control and monitoring of machine function.

In prior batter mixing systems, an amount of a dry mix material is combined with water to form a desired batter. The amount of dry mix formulation and water or other ingredients must be accurately mixed and maintained at a desired temperature to provide a batter having predetermined characteristics to provide desired coating of food products. Depending on the food products, the batch of dry mix material, the local environment and other factors, the predetermined characteristics can vary. The system must accurately and continuously mix the ingredients to form the desired batter, or the final product will vary in appearance, weight and taste. In prior systems therefore, the operator was required to be relatively skilled to monitor the operation to ensure proper mixing. If problems in the batter occur, it is typically only when the battered food products have been further processed, and the final product is not in compliance with predetermined quality control standards. It would therefore be desirable to allow selective control of the batter mixing system based on direct feedback from further processing steps or independent of an operator.

In this regard, prior systems have required manual monitoring of the consistency of the batter produced to attempt to maintain the desired batter characteristics. Instruments or methods for relative the viscosity of a product have been developed. Depending on the nature of the product and the viscosity, such methods vary. In the environment of large scale food processing, the batter consistency is generally of intermediate viscosity and monitoring is typically performed by the Zahn cup method. In this method, a relative viscosity is measured by the number of seconds it takes for a measured amount of product to flow out of a Zahn cup, which is a container with a hole in the bottom. Zahn cups are graded by the size of the hole. In such a technique, the measurement is somewhat subjective, and depending on the user, wide variations in readings are possible for the same batter mix. The Zahn cup measurement technique simply does not provide a reliable and repeatable measure of viscosity. Further, such a technique only provides a relative viscosity and does not provide any precise control parameter for the batter mixing operation. Other viscosity measuring techniques have been developed for fluids, depending on the nature of the fluid.

Additionally, with respect to a batter material for use in a large scale food processing environment, the above mentioned method of utilizing a Zahn cup to provide a relative measure of viscosity, is typically used when a batter is initially mixed. It is known that when a batter is first mixed, it exhibits different characteristics than most liquids. This is due to the mixture behaving more like a suspension of solids, rather than a true liquid. An operator who works a batter mixer typically has to test the viscosity of the batter at certain time intervals in order to know when the batter has become a homogeneous product. This process is time consuming and can result in a batter with a varying viscosity, particularly if different operators read the Zahn cup measurements differently.

It would therefore be desirable to provide a batter mixing system with the ability to accurately measure the actual viscosity of the batter or other material. More specifically, it would be desirable to provide a mixing system with an in-line viscometer used in conjunction with a programmable control system for the purposes of monitoring and controlling the production processes involved in a batter mixing system.

SUMMARY OF THE INVENTION

Based upon the foregoing, the present invention provides an apparatus and methods for mixing of a materials and controlling actual viscosity during the mixing process. The apparatus and methods overcome the limitations found in the prior art, and enable more precise monitoring and control of the production processes involved in a mixing system.

An object of the invention is therefore to provide a mixing apparatus and methods wherein the actual viscosity is monitored and controlled using an in-line viscometer to provide actual viscosity measurements. Another object of the invention to provide an apparatus for controlling viscosity, which provides a real-time viscosity measurement in centipoises. It is a further object of the invention to provide an apparatus for controlling viscosity, which provides a temperature control system for effectively controlling the temperature of the mixture, comprising a jacketed fluid heat exchange circulation system. The invention may also provide a control system, which may be programmable and integrated into a centralized process control for operation of the apparatus. Other advantages and attributes are also provided according the apparatus and methods of the invention.

In general, the invention is directed to an apparatus for controlling viscosity during mixing of at least a first and a second component. A source of the at least first and second components provides a predetermined amount of the components to a mix tank. A mixer is provided to mix the components into a substantially homogeneous product during a mix cycle. An in-line viscometer is coupled to the mix tank to receive a supply of the product therefrom, and provides an indication of the products actual viscosity. A control system controls the supply of the at least first and second components and the mix cycle to substantially maintain a predetermined viscosity.

The invention is also directed to a method for mixing of at least first and second components, wherein predetermined amounts of the at least first and second components are mixed into a substantially homogenous product. The product is selectively supplied to an in-line viscometer, which provides an indication of the products actual viscosity, and at least the supply of the first and second components is controlled to substantially maintain a predetermined actual viscosity.

Other objects and aspects of the present invention will be apparent upon review of the specification, drawings, and claims appended hereto.

DETAILED DESCRIPTION OF THE INVENTION

Figure 1:
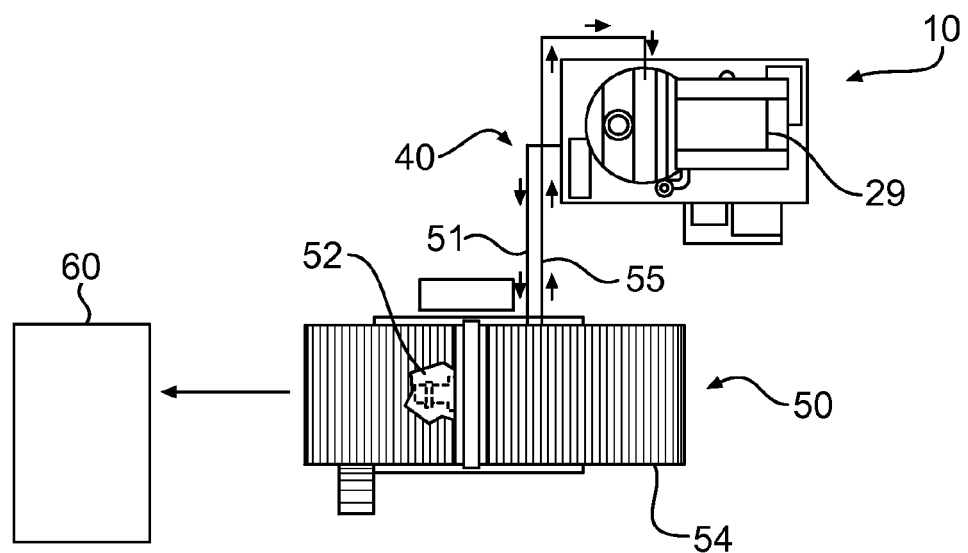
FIG. 1 is a top view of a mixing apparatus according to an embodiment of the present invention, in conjunction with a batter applicator used in a food processing system.

With reference to FIG. 1, an in-line processing system is shown to include a mixing system 10 according to an embodiment of the invention. The mixing system 10 may be used in a large-scale food processing system for example, to prepare a batter for coating of food products. In such an embodiment, the batter mixing apparatus 10 prepares a batter with a substantially constant specified viscosity, viscosity profile or range. The batter is then supplied via supply piping 51 to at least one batter applicator 50, as needed to form a pool of batter material 52 in which food products traveling on conveyor 54 are dipped and coated. The food products in many cases will be breaded prior to the application of batter, such as with flour pre-dusting or the like. Once the food product is coated with batter, it is conveyed to further processing equipment 60, such as a breading machine, an oven, fryer, or other equipment in an in-line processing system. Typically, the processing will include cooking or frying of batter/breaded food products, as well as subsequent freezing and packaging for preparing the product for sale.

As it is desired to coat the food products with a desired batter material which results in desired final product characteristics, it is highly desirable to maintain the characteristics of the batter formulation, particularly its viscosity. As food products being dipped in the pool 52 will cause changes in the batter characteristics within the pool 52, the present invention may provide recirculation of the batter from pool 52 to the mixing system 10, via return piping 55. Alternatively, as will be explained in more detail hereafter, the batter supplied to the applicator 50 may be on an as needed basis, with the level of the pool 52 monitored and used to selectively pump batter to applicator 50. In this way, the batter is maintained as a substantially homogenous product having predetermined characteristics. The characteristics of the batter result in a predetermined pick up of batter at the batter applicator 50 by food products being coated. It is desirable to maintain a predetermined pickup for efficiently coating food products and maximizing yield while minimizing costs. The mixing apparatus 10 can be precisely controlled in response to feedback control signals to ensure the desired pickup. For example, once the product is coated at the applicator 50, the actual pickup may be monitored, either manually or automatically, and control signals provided to the mixing apparatus 10 for control of the viscosity and therefore the desired pickup. Control functions and interface with other processing equipment will be described in more detail hereafter.

Figure 2:
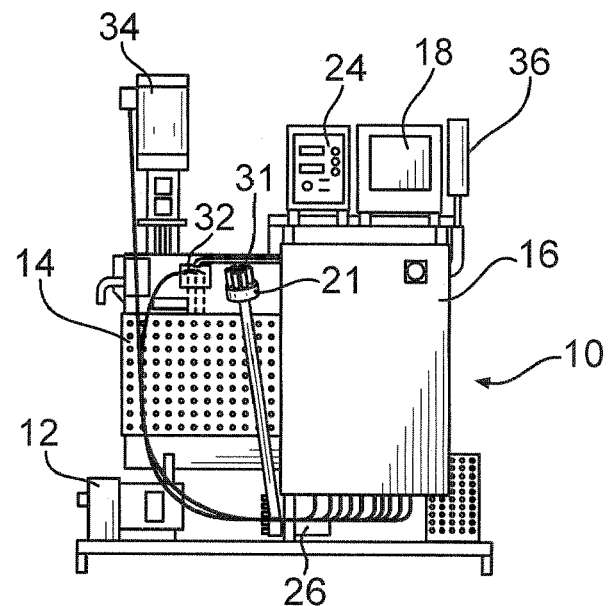
FIG. 2 is a front view of a mixing apparatus according to an embodiment of the present invention.
Figure 3:
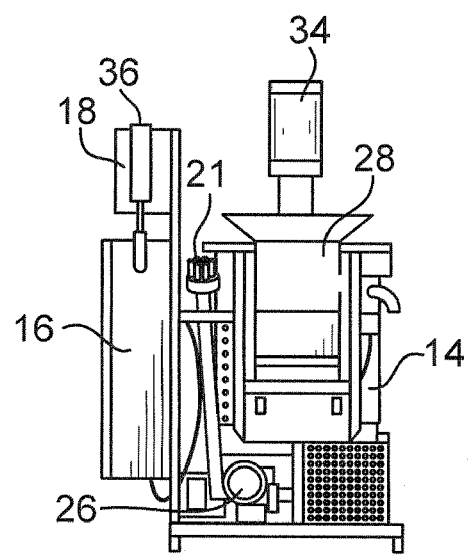
FIG. 3 is a side perspective view of the mixing apparatus as shown in FIG. 2.

The mixing apparatus 10 according to an embodiment of the present invention is shown in more detail in FIGS. 2 and 3. The apparatus 10 comprises a mixing tank 14, in which materials to be mixed are selectively introduced. In general, the mixing tank 14 is supplied with an amount of a dry batter mix material, along with an amount of water to form a batter having predetermined characteristics. In this embodiment, the tank 14 is configured to keep the mixture therein at substantially a predetermined temperature, without interference within the tank interior, which will be described in more detail hereafter. Controlling the temperature of the batter, as it is being mixed and supplied to the batter applicator is important to maintain the desired viscosity and batter characteristics. The apparatus 10 also includes a control system, generally designated 16, that in this embodiment may comprise a programmable logic controller (PLC). A touch screen display 18 is used to operate the control system 16. A viscometer control panel 24, providing user interfaces for operation and monitoring of the viscometer 21. The PLC control system 16, such as a programmable logic controller (PLC), is programmed to perform various operations in conjunction with the mixing and supply of materials by apparatus 10. The PLC 16 is also supplied with information from a plurality of sensors so as to continually monitor the operation of the apparatus 10, and supply and mixing cycles associated therewith. The control system 16, for example, monitors actual viscosity of the batter or other material in tank 14, in centipoises, by means of the inline viscometer 21. The control panel 24 may provide a visual representation of viscosity measured by viscometer 21, to allow a user to monitor the viscosity continuously and make adjustments when they are required. The control system 16 also monitors the temperature of the batter in the mixing apparatus with a temperature probe 22. Other temperature sensors may be used to supply the control system 16 with temperature data, such as in association with the batter applicator or at other locations. Other sensors or monitoring of additional aspects of the operation of apparatus 10 is also contemplated, such as the operation of pumps, fill and feed systems for constituents to be mixed, mixer operation, and the like.

The batter is mixed in tank 14 by means of a high speed mixing head 34, which is selectively disposed in tank 14, into a substantially homogenous product having predetermined characteristics that are thereafter maintained. As an example, a suitable mixing head 34 has been found to be a stainless steel 2 hp mixer produced by Admix, Inc. Such a mixer 34 may operate at high speeds, such as 1750 rpm, as compared to prior systems having much slower mixing speeds. The mixer 34 motor may be operated by a variable frequency drive to allow flexibility in the mixing characteristics of the system. For example, with some batter materials, it is possible to "overmix" the batter, causing degradation of desired characteristics. The ability to vary the mixer speed allows proper mixing characteristics to be achieved for the particular materials to be mixed. Higher mixing speeds may promote the break up of clumps or the like, and also facilitates the thermal treatment of the batter or other material by means of a thermal treatment system as will be hereinafter described, for chilling or heating the product in tank 14. Providing this and other components of the machine 10 in stainless steel or other sanitary materials facilitates use in the food processing industry or the like.

During the batter mixing operation, the batter being produced in tank 14, is selectively or continuously pumped to the inline viscometer 21 via a pump 26. The pump 26 may be a stainless steel viscosity pump and motor with direct drive, such as produced by Waukesha Cherry-Burrell Company. The pump 26 may be operated by a variable frequency drive to control flow to viscometer 21 as desired. The inline viscometer 21 measures the actual viscosity of the batter, in centipoises and in real-time, and the batter is then returned to the tank 14 before being pumped to the batter applicator 50.

To facilitate the initial formulation of the batter, a dry batter mix is provided in a dry mix hopper 28, having a capacity of 100 pounds for example. Desirably, the hopper 28 is situated at a relatively low height, which in the embodiment shown is positioned at a 53" feed height, to simplify dispensing batter mix therein. Once the mix cycle of the batter mixer has been started, a water supply line 31 fills the tank 14 with water until the water reaches a minimum level probe 32 that is found on the interior of the tank 14. When the water reaches a minimum level probe 32, the mixing motor 34 may be activated, which rotates a mixing head at a desired speed inside the mixing tank 14. The dry batter mix is then fed from the hopper 28 into the mixing tank via a feed conveyor 29 (shown in FIG. 1). The viscosity pump 26 is then activated and begins to measure the viscosity of the water and mix material in the mixture.

In the case of a batter material, continued mixing forms a substantially homogenous product from the feed materials. A thermal treatment system 15 is used to circulate heat exchange fluid in the jacketed portions 17 of tank 14, to cool (or heat) the batter or other homogenous product material to a predetermined temperature during the mixing cycle. Upon additional mixing, and once the appropriate viscosity and temperature are reached, additional water and dry batter mix may be added to the mixing tank 14 until a high level probe is reached. At this point in time, the water and the dry batter mix addition are stopped while the viscometer pump 26 continues to supply the viscometer 21 with material to measure the viscosity. If the mixture is too thick, additional water will be added to the tank in order to achieve the predetermined or set viscosity. Likewise, if the mixture is too thin, additional dry mix batter will be added to the tank in order to achieve the set viscosity. Once batter having the predetermined characteristics is achieved, an amount of batter may be pumped to the applicator 50 or other location for use, via a sanitary stainless steel feed pump 12 and motor with direct drive. The pump 12 may be operated with a variable frequency drive for speed and flow control, with operation of pump 12, as well as supply pump 26, provided by pushbutton control. Providing a variable frequency drive for operating pump 12 is preferred because of the flexibility in controlling supply of batter therewith. In a large-scale food-processing environment, a large number of pounds per hour may be coated, requiring a constant supply of batter to pool 52. A batter level monitor or sensor may be provided at applicator 50 to monitor the depth of pool 52 and maintain a needed supply of batter to pool 52 via control system 16 and variable frequency drive associated with pump 12. Any desired pumping volumes can be achieved by suitable control of the pump 12 by the control system 16. This eliminates the need for a pump and bypass line, which has been used in prior mixing devices using a fixed speed drive, to pump batter back to the mixing machine when no further batter is required at the applicator 50 or the like. Other control signals may be supplied from the applicator 50 or the like to allow selective control of apparatus 10. In the event that processing does not require constant refreshing of batter to pool 52 to maintain proper levels, it still may be desirable according to the invention to pump the batter from the pool 52 back to the mixing apparatus 10 and maintain a fresh supply of batter to pool 52. As pool 52 may be contaminated by breading materials, pieces of the food products themselves, water on the product, or other materials from food products passing through pool 52, the viscosity of the batter within the pool 52 can change. By pumping the batter from pool 52 back to the apparatus 10, and in turn supplying fresh batter to the pool 52 therefrom, the batter characteristics in the pool are maintained in a more uniform manner.

As previously mentioned, the mixing apparatus 10 according to this embodiment comprises a thermal treatment system, generally designated 15, to maintain the batter or other material at a predetermined temperature. As an example, the thermal treatment system 15 of the present invention may comprise a jacketed mixing tank, with jacketed portions 17 along the sides and/or bottom of the mixing tank 14. In past systems, a fluid heat exchanger having piping through which a heat exchange fluid was pumped was situated in along the tank walls, extending as ribs on the interior of a mix tank. Additionally, in many cases, the fluid heat exchangers of prior systems were not sufficient to cool the batter material to the desired temperature, thus requiring a supplemental heat transfer coil, usually positioned in the bottom of the tank. In these past configurations, the piping on the interior of the tank and/or the supplemental system, presented an obstacle or interference within the tank that adversely affects mixing of the constituents within the tank. Further, such systems presented a difficulty in cleaning of the equipment, due to the large amount of surface area exposed on the interior of the tank, which the batter is in contact with. Additionally, the interior of the tank was not smooth, which tends to impede the flow of batter adjacent thereto, thereby causing freezing of batter adjacent the tank walls, and non-uniform cooling of the batter.

In the present invention, the tank 14 is designed to have a polished, smooth interior surface, which allows efficient, and less restricted movement of materials in the mixing process. The thermal treatment system 15 is provided by forming tank 14 with jacketed portions 17. The jacketed portions 17 may be formed by interior and exterior walls, which are welded at intervals to create channels between the walls in which a thermal fluid for heat exchange with the batter can flow. The interior wall of the jacket forms the interior of tank 14, so as to be directly exposed to the batter therein, but without any interference within the tank volume. Water, ammonia, glycol, combinations thereof, or another suitable heat exchange fluid, are circulated through the channels located within the jacketed portions 17, thereby cooling and maintaining the batter, as it is constantly mixed, at a predetermined temperature. The jacketed portions 17 integrated into the tank 14 further provide in conjunction with the mixer, a swept surface heat exchanger that prevents the mixing tank from icing during the batter mixing. Icing of the tank 14 can cause significant problems, but the heat transfer provided by the thermal treatment system and the high speed mixing of the materials within tank 14 by the mixer 34 efficiently transfers heat between the materials in the tank 14 to minimize or eliminate freezing of the exterior of tank 14 and/or freezing of batter material adjacent the interior surface of tank 14.

The mixing apparatus 10 of the present invention may be further equipped with an alarm system which may comprise a visual alarm indicator 36, as well as producing an audible alarm if machine functions are out of specifications. The visual alarm system 36, for example, may have three colored lights, green, yellow, and red, that indicate the current status of the mixing apparatus 10. When the alarm system 36 is lit green, all parameters, such as viscosity, batter temperature, incoming thermal treatment fluid temperature, batter levels in tank 14, amounts of dry batter mix in hopper 28, the supply and temperature of incoming fill water, the status of the viscometer pump 26, the status of the feed pump 12, and many other parameters relating to operation of the machine 10, are within specification. If the alarm system 36 is lit yellow, then this indicates that at least one of the parameters is out of specification and needs to be corrected in order to ensure proper batter production. If the alarm system is lit red, then this indicates that one of the parameters needs immediate attention before proceeding with the mixing of the batter. As the various operation parameters can each have an adverse impact upon proper mixing and maintenance of the batter product, the ability to monitor each of these and allow effective response should a problem occur, provides significantly improved operation in conjunction with the overall processing system.

Figure 4:
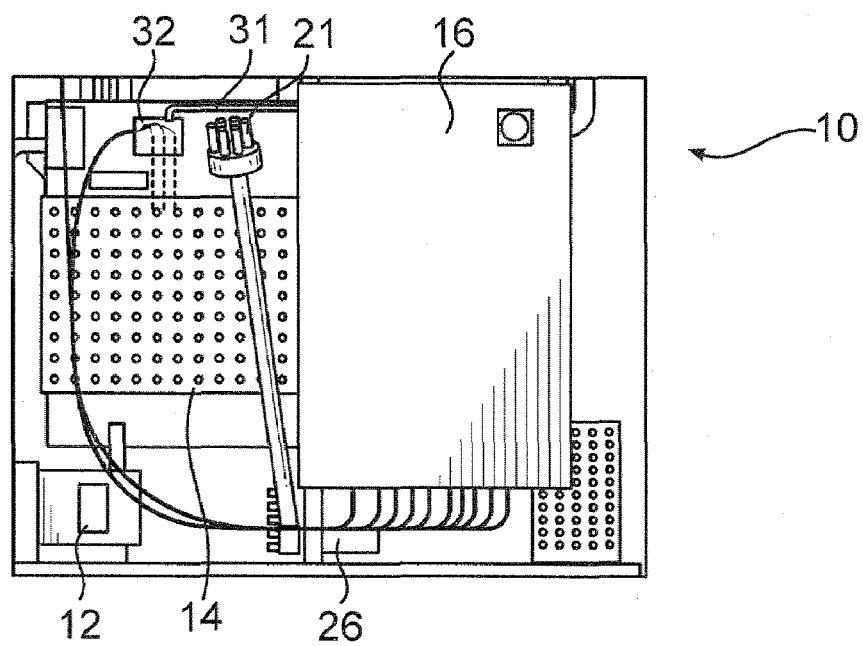
FIG. 4 is an enlarged partial front view of the mixing apparatus as shown in FIG. 2, according to an embodiment of the present invention showing the continuous supply of batter to an in-line viscometer system.

FIG. 4 is an enlarged view of the batter mixing apparatus 10 showing the circulation of material from the tank 14 through the inline viscometer 21. The direction of the arrow shows the path of the material, such as a batter, as it is circulated through the inline viscometer 21 and returned to the mixing tank 14. The circulation of material may be constant or intermittent as desired. In a preferred embodiment, the variable speed viscometer pump 26 housed under the mixing tank 14 continuously recirculates fresh batter through the inline viscometer 21. This allows the inline viscometer 21 to continuously measure the viscosity of the batter. Intermittent pumping of batter through the inline viscometer 21 may alternatively provide measurements at selected times. The viscosity is thereby monitored by the viscometer 21 and displayed, with the PLC control system 16 automatically adjusting the mix and mixer operation accordingly, in order to maintain the programmed viscosity set point.

Figure 5:
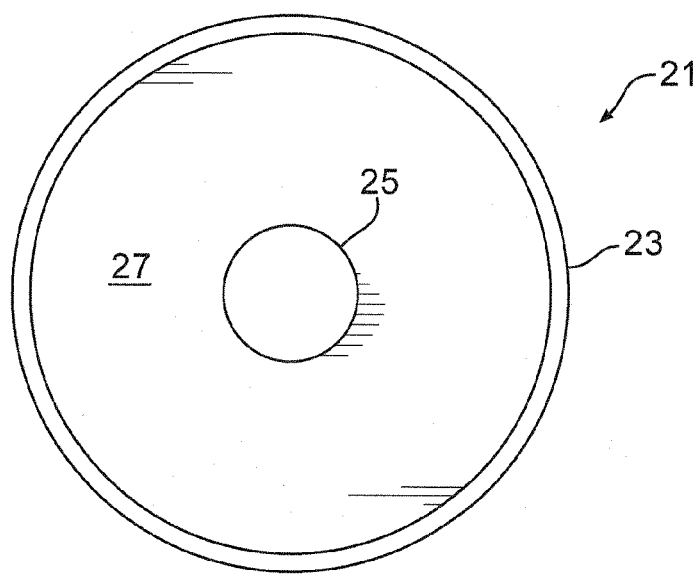
FIG. 5 is an enlarged partial top cross-sectional view of the in-line viscometer used in the mixing apparatus of the present invention.

Turning to FIG. 5, a cross-sectional view of the inline viscometer 21 is shown, wherein piping from the mix tank 14 supplies an amount of batter to the housing 23 via pump 26 as previously described. In this embodiment, the inline viscometer 21 is desirably of any suitable configuration to allow actual viscosity measurement in centipoises. For example, a suitable viscometer is produced by Brookfield Engineering, Inc., Model AST-100, wherein an ultrasonic probe is used to obtain a direct measurement of viscosity for a fluid in contact therewith. As seen in FIG. 5, the viscometer 21 may position the probe 25 within a housing 23, in a manner, which allows the batter or other material to flow fully around the probe in the circulation path. The ultrasonic probe 25 may be positioned in the center of housing 23 and spaced from the interior wall thereof, forming a channel 27 around the probe 25. As batter flows into housing 23, it will flow around the probe 25, contacting the probe as it flows though housing 23, and providing an accurate actual viscosity measurement that is supplied to control system 16. In this embodiment, the housing arrangement and supply of material to inline viscometer 21 is performed with minimal to no pressure drop across the sensor housing 23. Additionally, the sensor housing 23 may be hermetically sealed to avoid any moisture from entering the housing. Such moisture may cause problems in accuracy of the viscosity measurement or failure of the viscosity probe 25. Other methods to avoid condensation or communication of moisture in relation to probe 25 are contemplated, such as other sealing or drying arrangements, or inverting housing 23 to allow any moisture to drain from the system. To facilitate use in the food processing industry, a sanitary ferrule could be provided on the inlet and outlet for a sanitary tri-clamp connection, eliminating the machining of threads on the inlet and outlet, and facilitating access to and maintenance of the viscometer 21.

Figure 5A:
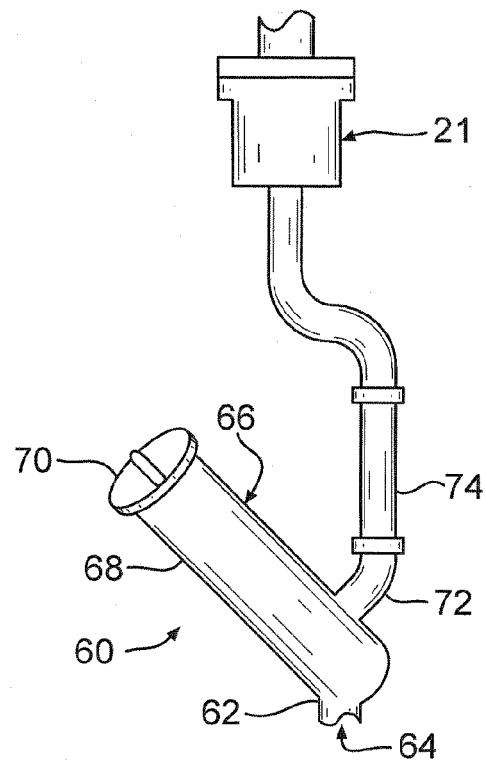
FIG. 5a is a partial front view of the filtering system and protection system on the inlet of the viscometer used in an embodiment of the invention.

As previously indicated, the inline viscometer 21 provides actual viscosity measurements, in centipoise, of the measured material, which may be a batter material for example. With this and other like materials, a problem may be created if the material is not substantially homogenous during the viscosity measurement. It may therefore be desirable to minimize such a problem, and in this embodiment, a particulate retention or filtering system 60, as shown in FIG. 5a, is provided to remove particulate or non-homogenous materials from the supply to viscometer 21. This system facilitates the viscosity reading performed by the inline viscometer 21. Prior to entering the inline viscometer 21, the batter is circulated through an inline filter system 60. This filter system 60 removes product particles and unreacted may that form clumps of material. The filter prevents product particles and clumps of batter from entering the housing 23 to ensure proper viscosity readings, and to prevent such materials from contacting the ultrasonic probe in the inline viscometer 21, which could cause physical damage to the ultrasonic probe. The filter system 60 may be of any suitable configuration, but may simply be a "Y" strainer located on the in feed line to viscometer 21. The strainer may comprise a first section 62 coupled to the in feed pipe 64 from the viscosity pump 26. A "Y" strainer 66 includes a strainer section 68 in which filtered material will collect, having an access port 70. An outlet 72 will supply filtered material to an outlet pipe 74. The control system may also be configured to operate the viscometer supply pump 26 to allow cleaning of the strainer section 68 without stopping the apparatus 10 during production. Again, any suitable filtering system, such as is known in the art may be used for this purpose, and this construction is merely an example thereof.

In addition, the viscometer 21 is also susceptible to damage from foreign objects or high-pressure fluid that it may be subjected to during cleaning of apparatus 10. In many environments, including the food processing industry, cleaning of the processing equipment is particularly important. Thus, the apparatus 10 may be subjected to rigorous cleaning processes, in which the sensitive viscosity sensor can be damaged. To avoid such problems, the supply system to the inline viscometer 21 as seen in FIG. 5a may include a protection system 75 to prevent any foreign objects or high-pressure fluid from entering the viscometer housing 23. Any suitable system for such a purpose may be used, such as an offset piping configuration 76, comprising two short ninety-degree sections 78 and 80, on the inlet to viscometer 21. Any other suitable barrier to such foreign objects and/or high pressure cleaning or other fluids is contemplated. The S-shape offset configuration forms a trap, which is positioned before the inlet of the inline viscometer 21. The filter arrangement 60 and protection system 75 facilitate the flow of the substantially homogenous batter into the inline viscometer 21 and protect the system.

As mentioned, the inline viscometer 21 is configured to provide actual viscosity measurement of the fluid passing therethrough in a continuous process. Desirable features of the viscometer 21 in this embodiment provide distinct advantages. As the material to be measured flows past a stationary probe, there are no moving parts, enhancing the reliability of the system. In the embodiment shown, the viscometer 21 is supplied with material in a recirculation cycle, and upon cleaning, is automatically cleaned in place, thereby minimizing down time. The viscometer 21 may have a broad measurement range, such as from 1 to 300 cps, and may be operated continuously to allow instant response to changes in viscosity in conjunction with the control system. The viscometer 21 is precise, and is calibrated with a calibration fluid rather than using subjective techniques such as the Zahn cup. As will be hereafter described, the viscometer 21 may also provide viscosity data to the control system or a central computer to provide a permanent record for quality control.

Figure 6:
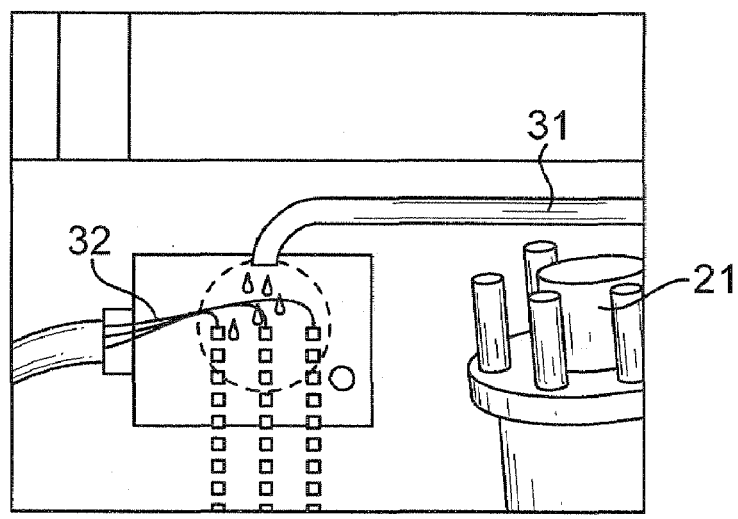
FIG. 6 is an enlarged partial view of a component supply system also serving to provide a self-cleaning function in the apparatus.

In the embodiment of the present invention as shown, the apparatus 10 includes a number of level sensors or probes positioned within the mixing tank 14 to monitor the level of batter therein. It has been found that if such sensors are coated with the batter material, and such material begins to dry, erroneous readings may result. This embodiment may therefore include a sensor cleaning system integrated into the liquid supply system of the mixing apparatus. As shown in FIG. 6, a probe cleaning system is disposed within the batter mixer apparatus. As the mixing tank 14 becomes filled with the mixture of dry batter and water, it eventually reaches a level probes 32 near the top of the mixing tank 14 to stop dispensing dry batter from the hopper 28 and water from the water supply line 31. As mixing continues in the mixing tank 14 and continuous viscosity measurements from the inline viscometer 21, batter can coat the level probes 32. The coating of the level probes 32 can result in false readings, possibly causing improper delivery of ingredients to the batter applicator 20 or other problems. For example, instead of additional dry batter mix and water being added to the mixing tank 14, the batter will continue to be delivered to the batter applicator. In the liquid supply system, water from the water supply line 31 can be delivered into the tank 14 at the location of the level probes 32, ensuring that they are clear of any wet batter that may have accumulated and ensuring an accurate batter level reading in the mixing tank 14. This operation can be performed automatically or manually as desired.

Figure 7:
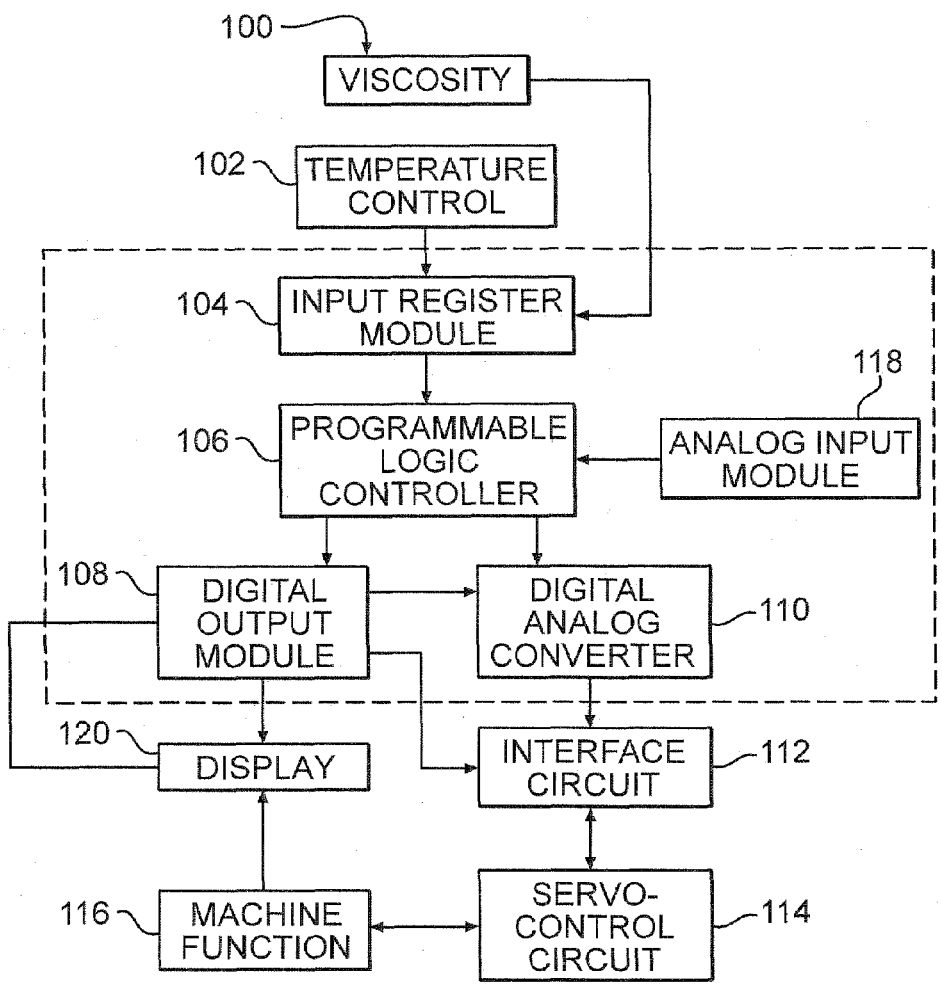
FIG. 7 is a block diagram of an embodiment of the control system of the batter mixer apparatus of the present invention.

Turning now to FIG. 7, a simplified block diagram of the improved control system for the batter mixing apparatus of the invention is shown. The control system of the invention comprises a computer interface mixing control system, which greatly simplifies use of the mixing apparatus and allows a great amount of flexibility in the operation thereof. Input variable parameters such as viscosity 100 and temperature control 102 show basic parameters, which may be effectively controlled by the control system. Although these parameters represent basic parameters, which can be precisely controlled in operation of the batter mixing apparatus, a variety of other dynamic variable parameters may be similarly controlled by selection of the desired parameters as inputs to the control system. In the preferred form, selecting input values of these variables for set up of the mixing to be performed by the apparatus may control each of the dynamic variable parameters relating to the function of the mixing apparatus 10. A selected viscosity value may be manually entered via a touch screen or keyboard interfaced either integrally or selectively to an input register module 104. The viscosity of the batter or other material relates to a predetermined quantity of dry and liquid ingredients, which are deposited into the mixing tank 14. Setting of the viscosity parameter for a mixing cycle will relate to the particular type of batter or other material. It should also be understood that inputting of a selected parameters may be performed by any suitable alternative to the keyboard, such as push buttons, limit switches or the like.

Another possible input variable as an example, is the temperature control 102, which generally refers to temperature control of the material in the mixing tank 14, at the applicator 20, and in the feedback loop of the mixing system as seen in FIG. 1, or at other locations. The temperature controllers may be interfaced with the control system of the invention, wherein the input values set for each of these parameters at 102 will be fed to the controller and continuously monitored. Thus, temperature control of these various aspects of the mixing apparatus system can be effectively accomplished by the operation of the thermal treatment system in conjunction with individual temperature sensors, at the mixing tank 14, the applicator 20, or at other stages of processing if desired. The temperature sensors controllers may be interfaced with the control system of the invention, wherein the input values set for each of these parameters at 102 will be fed to the controller and continuously monitored, with operation of the thermal treatment system controlled to maintain desired temperatures of the mixed material, incoming constituents or the like. Another aspect of properly mixing a batter or other material is controlling the temperature of the input materials to tank 14. For example, if the supply water or other fluid is not at a predetermined temperature, or if the temperature fluctuates, it can have adverse effects on the characteristics of the batter or other material. A temperature sensor to monitor the temperature of the supply fluid or materials may allow automatic adjustment of other parameters to compensate, alert the operator or the like. It may also be desirable to provide the supply water at a predetermined water pressure, which as an example, may be 24 PSIG with 10 GPM capacity.

These and other pre-selected dynamic variable parameters are input into the input register module 104, and are thereafter supplied to a programmable logic controller 106, which is programmed and adapted to provide automatic operation of a batter mixing process. The PLC 106 of the mixing control system enables inputting and monitoring of process control parameters in a user friendly and extremely flexible manner. The process parameters as described above as well as any other process parameters may be initially input into the PLC 106, which has an internal random access memory (RAM) which may be utilized to store a large number of batter recipes or process parameters for mixing of various materials, within the control system. The batter recipes or the like may be identified by any suitable designation, wherein upon desired use of a particular batter, the batter recipe may be downloaded from the control system to automatically set up the process parameters for the particular batter mixing operation. This will greatly reduce set up time and minimize operator activities with respect to initiating a mixing cycle. Thus, once an acceptable batter is produced for a particular batter recipe, the viscosity, temperature and other parameters for that particular batter would be established and could thereafter be programmed into the control system for subsequent use. Any subsequent use would merely require inputting of a designation assigned to a particular batter recipe to be used, wherein all process parameters and subsequent operation of the mixing cycle would occur without operator intervention. The PLC 106 may also have the capability to lock in the process parameters, wherein the operator would not be capable of modifying such parameters, to ensure the preservation of product integrity as well as to facilitate diagnostic analysis and trouble shooting of any problems that may arise in the mixing process. This also allows the use of relatively unskilled labor to operate the system.

This system also provides the capability of generating quality control and production control reports relating to use of the batter mixing apparatus and enables the user to gather data over an extended period of time, and trace variables relating to the mixing operation on one or more mixing apparatus. The traceability of processing parameters gives the user the ability to determine process controls to allow real-time adjustment of the apparatus 10 to produce desired results. This can provide significantly higher yields and value in light of today's stringent tightening of quality control standards, especially in the food industry. The use of a PLC 106 also gives the control system a great amount of flexibility as various options may be easily added or subtracted as the PLC 106 has available various input and output communication ports for linking with various other processing devices or otherwise.

In an embodiment, the PLC 106 is operatively coupled to a digital output module 108 which may generate output signals corresponding to various of the input process parameters. Input parameters may include viscosity 100, temperature control variables 102, such as for the batter or other material temperature, the cooling system temperature, the temperatures monitored at one or more applicators being supplied by apparatus 10, the temperature of incoming supply materials or the like. Additional variables may be the set levels in the tank 14, the set parameters for the thermal treatment system for cooling or heating the material in the tank 14, the viscosity, the set parameters for the mixer, pumps and other systems of apparatus 10, alarm set points and the like. The PLC 106 may thus provide control signals to the thermal treatment system; material feed systems, pumps, mixer and other devices of the mixing apparatus 10. For example, digital output signals generated from digital output module 108 may be fed through a digital to analog converter 110 to generate analog signals used to set mixing process parameters. Additional process parameters may also be supplied from the PLC 106 directly to the D/A converter 110 for setting of the parameters for a particular batter recipe or the like. Output signals from the processing circuit comprising PLC 106, digital output module 108 and the D/A converter 110 may thereafter be coupled to an interface circuit 112, which is adapted to interface the PLC 106 and associated processing equipment to a servo-control circuit 114 which controls and implements machine functions 116 and receives feedback for control of various process parameters. The servo-control circuit 114 may be formed as a closed-loop servo-control that provides dynamic feedback of measured process parameters for comparison with the control inputs generated by PLC 106. The difference between the pre-selected input and the measured output may then be used to drive the system toward a dynamic state which reduces any differences to zero, so as to obtain an extremely precise control of viscosity, temperature, and other parameters. Additionally, as will be described more fully hereinafter, the PLC 106 interfaced with the servo-control circuit 114 via interface circuit 112 allows various parameter profiles to be created in the system, wherein any deviation from such profiles may be indicated and used for process control as well as information and data collection. Feedback control signals may also be provided from the servo-control circuit 114 and coupled via interface circuit 112 to analog input module 118, adapted to receive various analog signals from measured process parameters which are converted to digital signals and fed back into PLC 106 for continuous process control and monitoring as well as data collection. Additionally, a variety of machine functions as well as input variables may be displayed on a suitable display device 120 for visual feedback to the machine operator as to the status of a mixing cycle, various process parameters and a variety of other information.

Figure 8A:
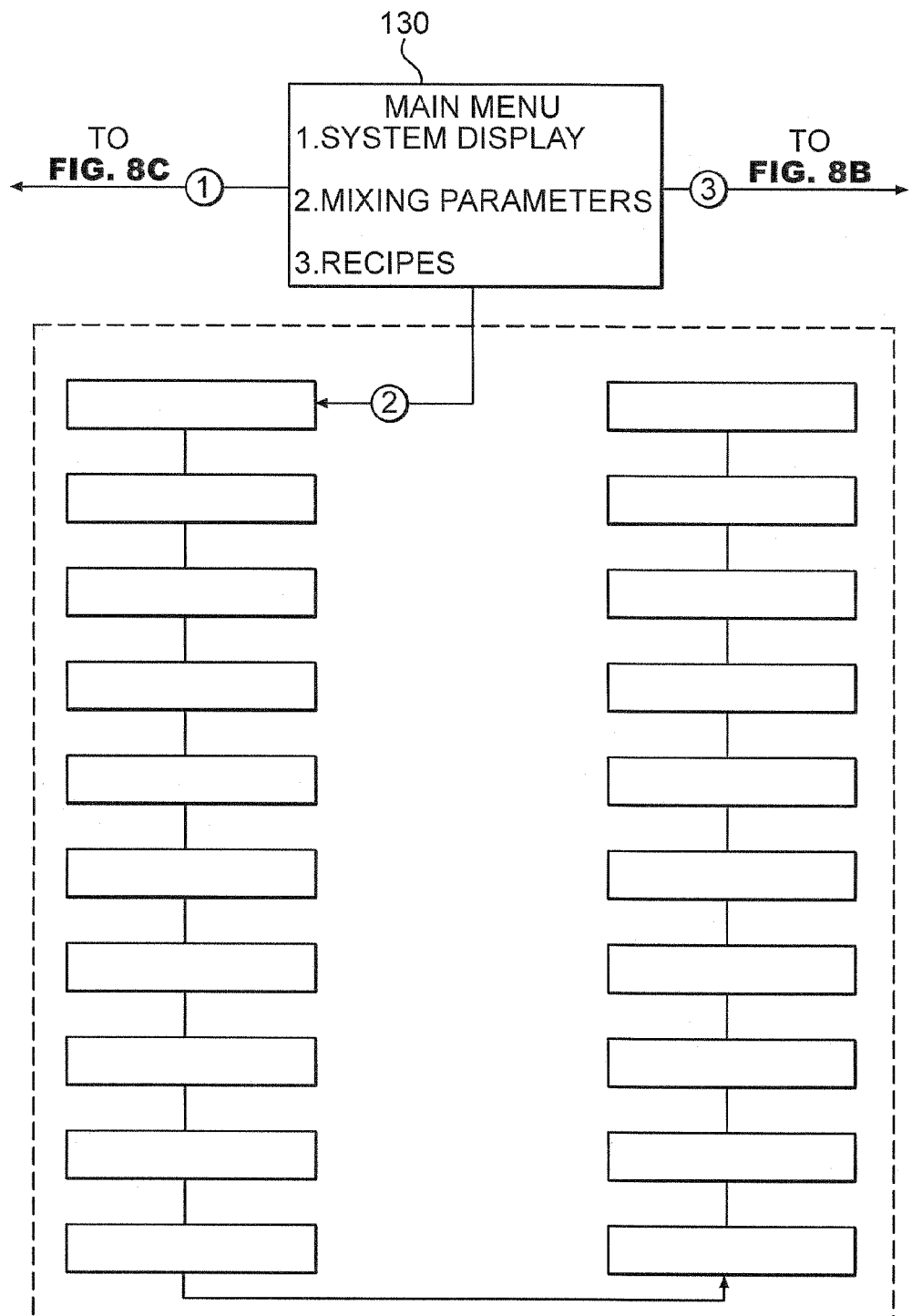
FIGS. 8a-c shows flow charts indicating function of the control system in operating the mixing apparatus according to an embodiment of the present invention.

Turning now to FIG. 8, there is shown a flow chart indicating set up and functioning of the control system in various aspects of the mixing process. In the control system, the PLC 106 may have a run mode and a program mode associated with a particular batter mixing program or other material. In a food processing system as an example, a batter recipe is prepared in accordance with the process control parameters, which are found to produce high quality product. The PLC is initially placed in program mode, wherein a touch screen monitor or keyboard may be used to provide input of the various process control parameters for the batter, as may relate to a particular food product, mix material or the like. The PLC may be programmed to provide menu driven programming of a batter recipe into the PLC. As seen in FIG. 8a, a main menu is generated from the control system and PLC 106 as indicated at 130, wherein various alternatives of system display, viscosity parameters or batter recipes programmed or to be programmed can be displayed.

Figure 8B:
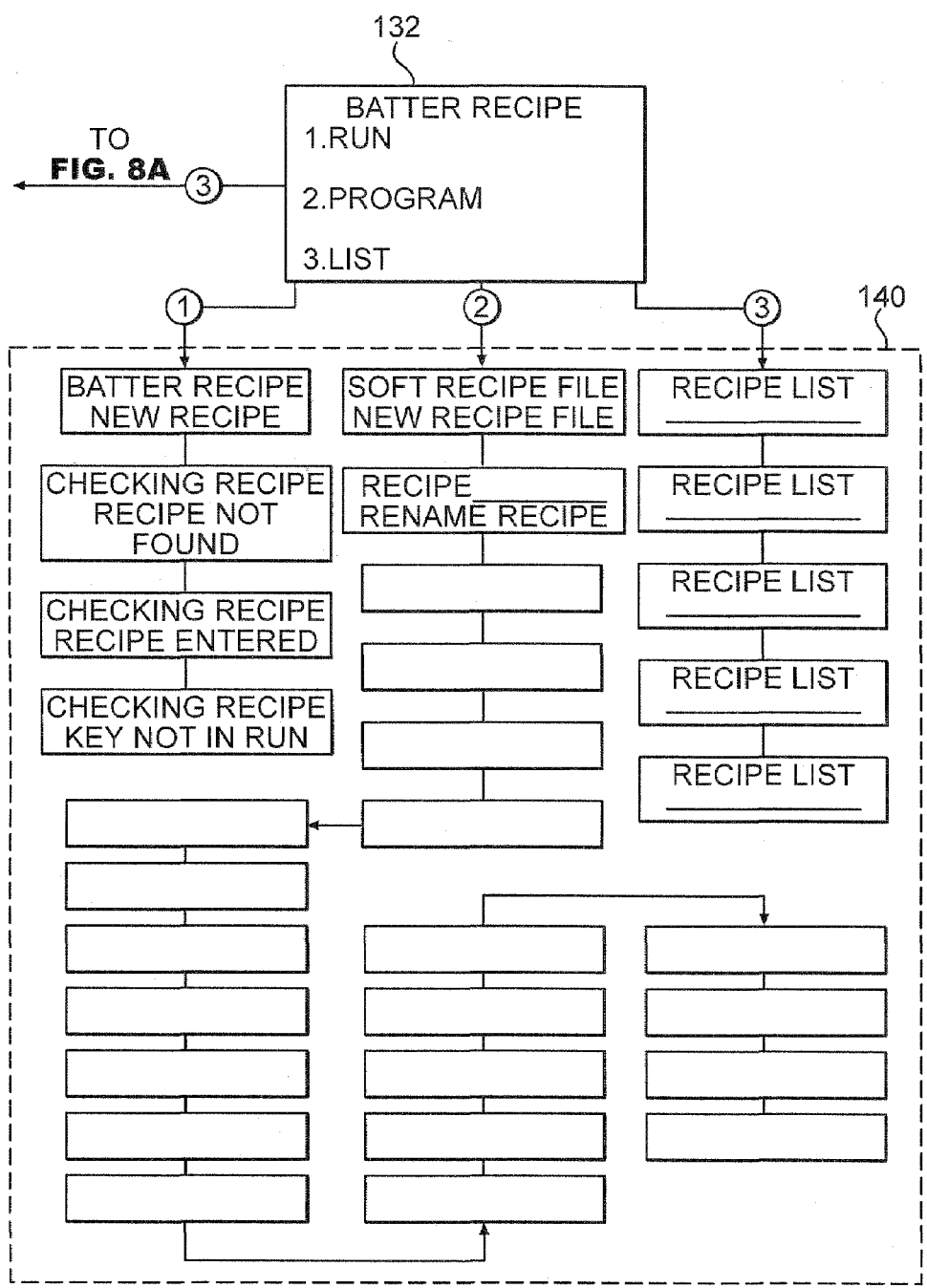
Figure 8C:
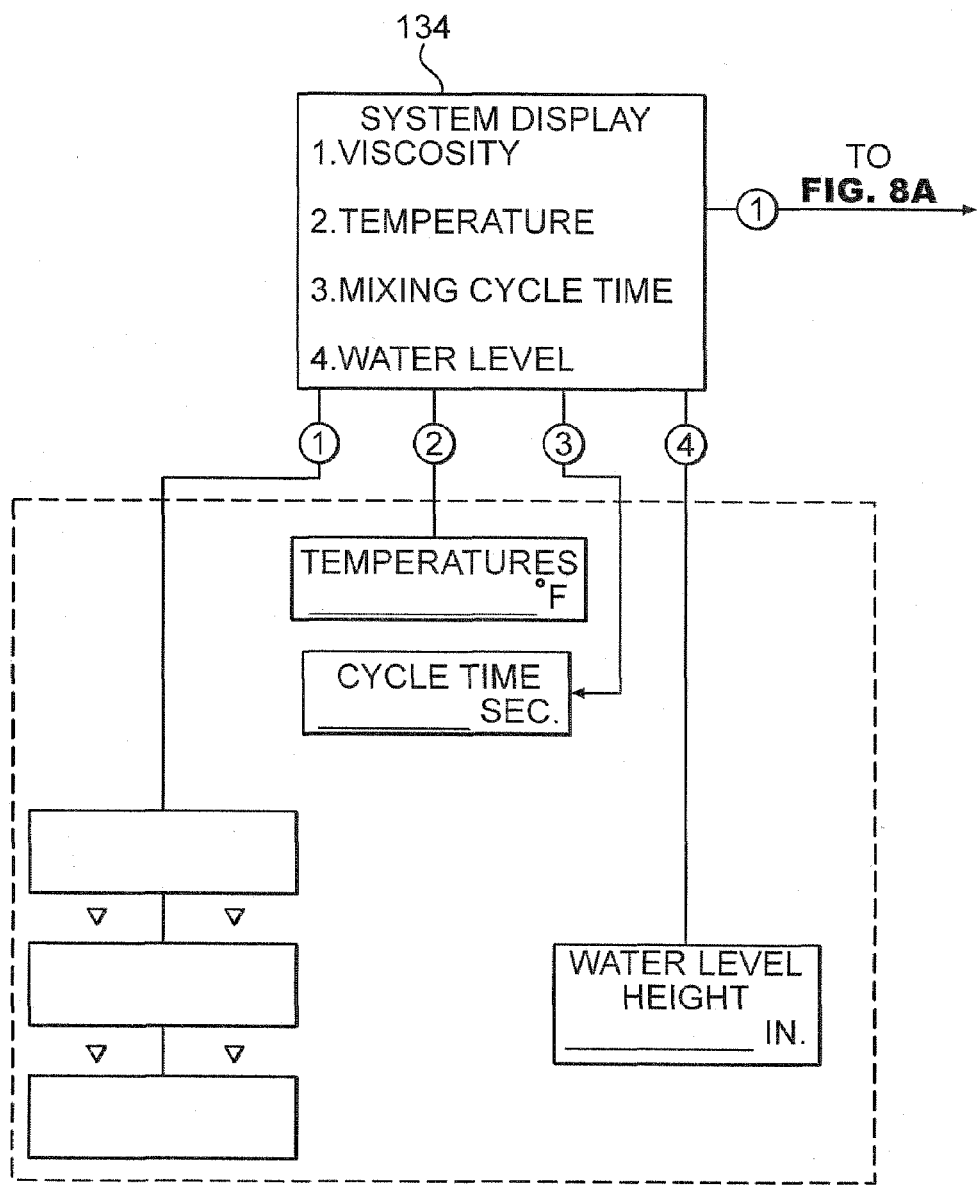

In the system display option as seen in FIG. 8c at 134, various process parameters including batter temperature, batter viscosity, mixing cycle time, liquid level in mixing tank, pump speeds, mixer speed, thermal treatment system parameters, supply material parameters or the like, are displayed. Various functions of the batter mixing apparatus and the status of these functions may be displayed as indicated at 136.

Alternatively, the operator may select a display of the mixing parameters as indicated in FIG. 8*a* at 130, wherein parameters such as mixing tank temperature, batter applicator temperature, supply water temperature, batter viscosity in the mix tank, batter viscosity at the batter applicator, mixing time, status of levels from the level probes located within the mix tank and other parameters as desired may be displayed. If an operator who is knowledgeable with respect to the mixing process is implementing a mix cycle, the control system may be switched into a run-edit mode wherein the operator can modify any of the process parameters, which are deemed necessary. For example, if various external factors are found to affect the temperature control settings of various portions of the apparatus, the operator may adjust the temperature settings to compensate for the external factors. Alternatively, the control system may be switched into a run-only mode, wherein the process parameters may not be modified by the operator. This feature essentially allows the operator to be taken out of controlling the mixing process to ensure consistency and increase overall control of the mixing process. Thus, the operator does not necessarily need to be particularly competent with respect to setting up and operating the batter mixing apparatus to achieve high quality product and the batter mixing process may be performed more cost effectively and efficiently. As all functions of the batter mixing apparatus are effectively controlled by the control system, operation of the apparatus can be carried out essentially automatically.

To enable automatic operation of the apparatus, a number of mix recipes may be programmed into and stored within the control system. As indicated in FIG. 8*b* at 132, the operator may select the mix recipe option from the main menu 130, wherein a programmed mix process may be run, a new mix process may be created or an existing process may be listed. As indicated at 140, initiation of a mixing cycle using a programmed batter recipe for example, may be selected by indicating the batter recipe to be used, wherein the control system will download the selected recipe or indicate that such a recipe does not exist. Alternatively, a process engineer or knowledgeable operator may program in a new batter recipe or edit an existing recipe, wherein each of the process parameters will be displayed if existing, and editing thereof can be performed, or a new recipe may be created. As another option, any recipe may be listed, whereby the process parameters may be viewed accordingly.

Prior mixing systems were also deficient with respect to operating within a large scale food processing environment, wherein multiple shifts are employed to maintain the operation of the processing line over extended periods. During such periods, either at shift changes, at the end of production runs or otherwise, there may be the need to shut down the mixing apparatus. In such an event, the prior systems have typically simply been shut down at such time, with any unused batter being discarded. Past systems have been configured to operate to maintain an amount of batter in the machine for use, resulting in a significant amount of material being discarded upon these occurrences. In the present invention, an efficient shut down cycle is enabled by the control system 16. At the end of a production run or other time as warranted, a program is initiated on the mixing cycle screen of the touch screen monitor 18 to initiate a shut down procedure. Activation of this program turns off the level probes located within the mixing tank 14 and allows for the delivery of the batter from the mixing tank 14 to the applicator 20 without additional dry batter mix and water being added to the mixing tank. This feature can significantly reduce batter waste, such as from approximately 65 gallons down to 3-5 gallons on a daily basis. While the mixing tank is being drained during a shut down procedure, the programmed viscosity set point is maintained.

Figure 9A:
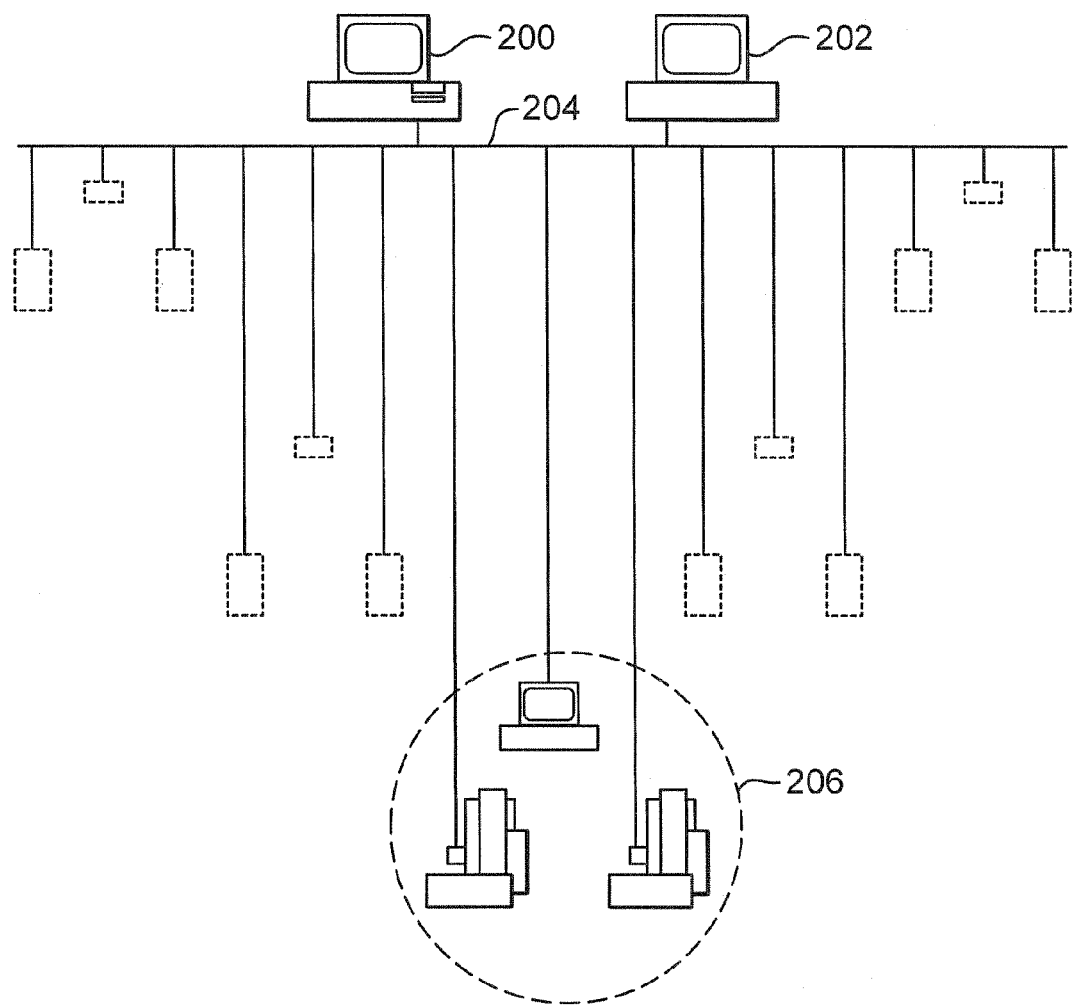
FIG. 9a-b shows generally schematic diagrams of an embodiment of the invention, with a plurality of mixing apparatus networked to a central control system in accordance with the invention.
Figure 9B:
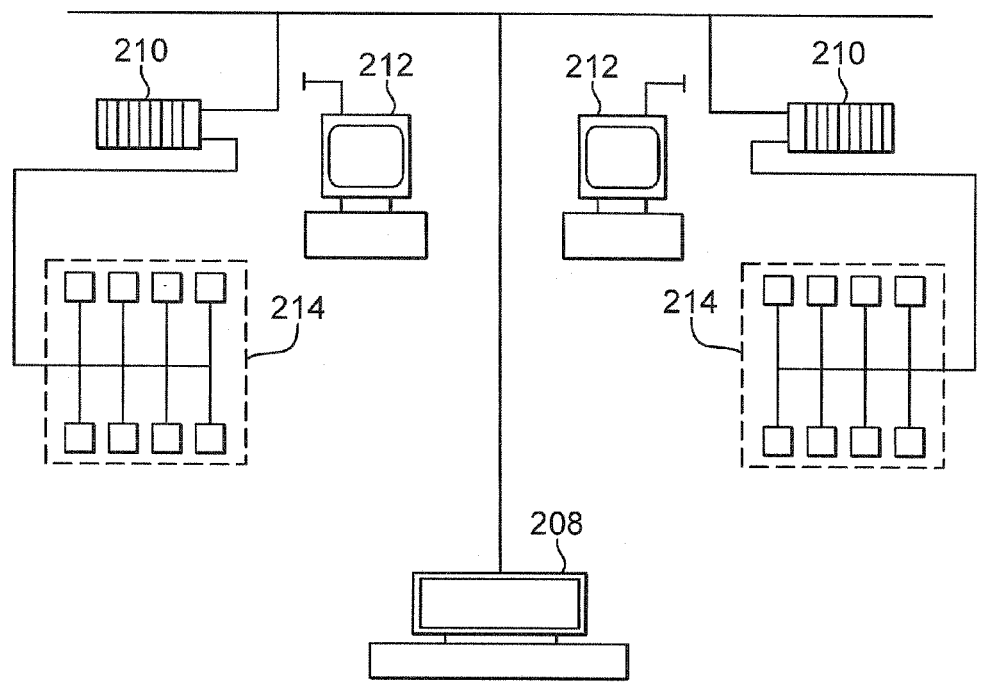

Turning now to FIG. 9*a*, an embodiment of the invention is shown, wherein a plurality of batter mixing machines may be networked together and operated from a central control facility to achieve distinct and advantageous capabilities. The control system of the invention including a PLC, has the capability of being networked with a central control facility as indicated at 200 and 202. The central control facility may simply comprise a host computer, which need be no more than a standard personal computer having a sufficient amount of memory to handle the number of mixing machines on a particular network. The host computer may be coupled to the mixing machines 10 by means of a local area network (LAN) as indicated at 204, which is adapted to communicate with the PLC of the control system for each individual mixing apparatus. LAN utilizing a network interface module (NIM) as an example. The LAN is adapted to allow communication from the host computer to individual mixing machines 10 as indicated at 206. As seen in FIG. 9*b*, a system coupled to the LAN may comprise an operator interface control station 208. The operator interface provides a display for the operator on which system parameters and function of the mixing machine 10 may be viewed. A plurality of PLC's including input/output registers are shown at 210 and are coupled to the LAN 244, and forming part of the control system for a plurality of mixing machines. The individual PLC's may be programmed or edited via a programmable controller operator interface module 212 which may be selectively coupled to the PLC's as necessary. The PLC's may in turn be programmed to control operation of the machines 10, such as the thermal treatment systems indicated at 214 for control of the temperature of the batter or other material as previously described.

In an example operation of the system 10, the touch-screen 18 contains all process controls and information, allowing all settings to be made on the touch-screen. Once set, a single touch button is usable to implement the entire mix and operation cycle of the apparatus 10. Once electrical, temperature control are connected and turned on, and input water supply is connected along with dry mix in the hopper, a mix cycle can be initiated. As an example of the sequence of operations performed by machine 10 for production of a batter material, an operator will open a Refrigeration screen of the control system, and program the desired temperature. A Refrigeration Start button is actuated to allow the tank to begin chilling a heat transfer fluid prior to mixing batter. The Refrigeration screen may also allow the operator to monitor the supply water temperature as well as the batter temperature at the applicator 20, via temperature probes. The operator then opens a Viscosity screen and programs the desired viscosity in centipoises. Thereafter, a Mix Cycle screen is opened, and a Mix Cycle Start button actuated. Once actuated, the inlet water to the mix tank is initiated, until water reaches the minimum level probe in the tank. Then the mixer, dry mix and viscosity pump 26 automatically begin mixing of the dry mix into the water until the desired viscosity and temperature is reached. Upon reaching the programmed parameters, the system will automatically add additional water and dry mix until the tank is full, maintaining the desired viscosity and temperature. When the batter reaches the high level probe, the water and dry mix are turned off, while the mixer and viscosity pump 26 operate to maintain the desired parameters. A Feed Pump screen will then be used to begin circulation of batter to the applicator 20, and to recirculate the batter form machine 20 by means of a return pump if desired. Setting the speed of the variable speed feed pump can control the supply of batter. The feed pump should normally be started when the high level probe is reached, allowing additional batter to be produced as soon as pumping of batter to applicator 20 begins. The operator may then go to a Tank Liquid Level screen to monitor the tank filling operation. This screen may also indicate whether the water or dry mix is on, as well as the tank temperature. If the screen indicates the tank is full when it is not, the operator can press a Clean Probes button to remove excess batter from the level probes. Production can then occur until operation of the machine 10 is desired to be halted, with additional water and dry mix added as needed to maintain the desired parameters and volume of batter in the mix tank. Upon desiring to stop operation, the operator can actuate a Shut Down Cycle button, which allows the mix tank to drain. Thereafter, a Mix Cycle Stop button is actuated to terminate operation of the machine 10, wherein all operations of the machine 10 are stopped, except for operation of the feed and return pumps, which may be turned off from the dedicated screens. A Technical Support screen may be provided to access an Alarm List, print time for a printer, a Spare Parts List and support contact information if desired. The Alarm List may provide a record of all overloads, faults, E-Stop commands or other errors or actions in an operation cycle, along with identifying information such as date and time for record keeping and trouble shooting. The Spare Parts List allows a user to easily determine any spare parts required to assist in ordering thereof.

Although the invention has been described relative to particular preferred embodiments thereof, it should be apparent that various modifications or variations in the apparatus or details of operation are contemplated herein and would occur to those skilled in the art. The invention is therefore not to be limited by the details of the description of the preferred embodiments, but rather is intended to encompass all such modifications, which are within the spirit and scope of the invention as defined by the appended claims.

What is claimed is:

1. An apparatus for controlling viscosity of a food batter material comprising:
    a source of a first batter component;
    a source of a second batter component;
    a mix tank and a mixer, wherein the predetermined amounts of the at least first and second components are selectively introduced into the mix tank and mixed by the mixer to form a food batter material which is selectively pumped by a first pump to supply the batter to a separate food coating system for use;
    a viscosity control system comprising a second pump operating to pump a uniform volume of the batter material from the mix tank through a separate supply line to an in-line viscometer housed in association with the separate supply line, wherein the viscometer continuously measures the viscosity of the food batter as it flows through a housing in which the viscometer is positioned, wherein the viscometer is an ultrasonic probe which provides a measurement of the actual viscosity of the food batter material,
    a filtration system provided in association with the separate supply line before the in-line viscometer to filter the batter material and supply a substantially uniform batter material to contact said ultrasonic probe;
    a control system receiving the signal from the viscometer and continuously controlling at least the supply of the first and second components to the mix tank to substantially maintain the batter material at a predetermined viscosity.

2. The apparatus according to claim 1, wherein the in-line ultrasonic probe viscometer is positioned within said housing, with the second pump supplying an amount of batter material to fully contact the probe within the housing.

3. The apparatus according to claim 2, wherein the ultrasonic probe is disposed in the housing in a manner which allows the material to flow around the probe.

4. The apparatus according to claim 1, wherein a protection system is disposed before the in-line viscometer to prevent foreign objects or high-pressure fluid from entering the viscometer housing.

5. The apparatus according to claim 1, wherein the mix tank has a thermal treatment system associated therewith, comprising a jacketed tank in which a heat exchange fluid is circulated.

6. The apparatus according to claim 5, wherein the mix tank is jacketed on its sides and bottom.

7. The apparatus according to claim 5, wherein the mix tank has a smooth, polished interior surface and the mixer operates at high speeds to cause mixing and movement of batter material in the mix tank, wherein the smooth interior surface in conjunction with the movement imparted by the mixer provide a swept surface heat exchanger to increase the heat transfer from the thermal treatment system adjacent the interior surface.

8. The apparatus according to claim 1, wherein the mix tank has a smooth, polished interior surface.

9. The apparatus according to claim 1, wherein the control system comprises a PLC in which variable operational parameters of the apparatus are programmed.

10. The apparatus according to claim 9, wherein the PLC is supplied with feedback signals to control variable parameters of machine operation.

11. The apparatus according to claim 1, wherein the control system is networked to a central control which supplies operational parameters thereto.

12. The apparatus according to claim 1, wherein the control system includes a plurality of mixing recipes, and a recipe is selected for operation of the apparatus according to the recipe.

13. The apparatus of claim 1, wherein the control system includes a shut down procedure wherein said shut down procedure interrupts said supply of said at least first and second component to said mix tank and permits substantial emptying of said product from said mix tank.

14. The apparatus of claim 1, wherein said control system receives viscosity and temperature readings from a batter applicator to which the batter material is supplied.

15. The apparatus according to claim 1, wherein said ultrasonic probe is positioned in said housing to form a flow channel therearound, wherein the second pump provides flow of the material around the probe in the flow channel with substantially no pressure drop across the housing.

16. The apparatus according to claim 1, wherein the viscometer comprises a housing with a system to substantially prevent moisture from entering the housing or to remove any moisture from the housing.

* * * * *